(12) United States Patent
Yoda et al.

(10) Patent No.: US 6,912,769 B2
(45) Date of Patent: Jul. 5, 2005

(54) METHOD A FABRICATING A MAGNETIC HEAD

(75) Inventors: Hiroaki Yoda, Kawasaki (JP); Kohichi Tateyama, Ichikawa (JP); Yusuke Ohinata, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 61 days.

(21) Appl. No.: 10/389,765

(22) Filed: Mar. 18, 2003

(65) Prior Publication Data

US 2003/0156355 A1 Aug. 21, 2003

Related U.S. Application Data

(62) Division of application No. 09/668,343, filed on Sep. 25, 2000, now abandoned.

(30) Foreign Application Priority Data

Sep. 24, 1999 (JP) .......................... 11-271365

(51) Int. Cl.⁷ .................. G11B 5/127; H04B 31/00
(52) U.S. Cl. ................ 29/603.13; 29/603.07; 29/603.14; 29/603.15; 29/603.16; 29/26.1; 216/65; 360/122; 360/125; 360/126; 360/127; 360/128
(58) Field of Search ........... 29/603.07, 603.13–603.16, 29/426.1; 360/122, 125–128; 216/65

(56) References Cited

U.S. PATENT DOCUMENTS

| | | | |
|---|---|---|---|
| 4,160,315 A | | 7/1979 | Tandon et al. |
| 5,245,493 A | | 9/1993 | Kawabe et al. |
| 5,283,942 A | | 2/1994 | Chen et al. |
| 5,285,340 A | | 2/1994 | Ju et al. |
| 5,296,982 A | * | 3/1994 | Terada et al. ............ 360/234.5 |
| 5,301,418 A | * | 4/1994 | Dirne et al. ............. 29/603.18 |
| 5,665,607 A | * | 9/1997 | Kawama et al. ............... 438/64 |
| 5,858,182 A | | 1/1999 | Horng et al. |
| 5,912,790 A | | 6/1999 | Yoda et al. |
| 6,173,486 B1 | | 1/2001 | Hsiao et al. |
| 6,178,070 B1 | | 1/2001 | Hong et al. |
| 6,275,354 B1 | | 8/2001 | Huai et al. |
| 6,289,578 B1 | | 9/2001 | Kamijima |
| 6,523,236 B1 | * | 2/2003 | Nishikawa et al. ........... 29/890 |

FOREIGN PATENT DOCUMENTS

JP          63266607 A   *  11/1988  ........... G11B/05/23

OTHER PUBLICATIONS

"Development of a self–peeling suspension for non–crash, non–stick and low fly–height"; Hatamura, Y.; Yanabe, S.; Ishimaru, N. Shinohara, T.; Ito, M.; Magnetics, IEEE Transactions on, vol.: 26, Issue: Sep. 1990; pp.: 2484–2486.*

Mine et al., "Perpendicular Recording Characteristics of Single Pole Thin Film Head," Nov. 1991, IEEE Transactions on Magnetics, vol. 27, No. 6, pp. 4930–4932.

* cited by examiner

*Primary Examiner*—Paul D Kim
(74) *Attorney, Agent, or Firm*—Foley & Lardner LLP

(57) ABSTRACT

A magnetic head is configured by forming a thin-film-shaped magnetic element on top of a thin film that is provided parallel to a medium-facing surface. An aperture is formed in the thin film, and part of a main magnetic pole is formed to have a tip portion that protrudes into that aperture. This configuration makes it possible to impose highly accurate control over the amount by which thin-film-shaped magnetic elements are recessed from the medium-facing surface, while simultaneously exerting accurate control over the amount of protrusion of the main magnetic pole tip portion by making the thickness of the thin film extremely small. As a result, the recording flux strength at the main magnetic pole tip portion can be increased to the ultimate value thereof, making it possible to supply a head that can record on a high retention force medium suitable for higher densities.

4 Claims, 13 Drawing Sheets

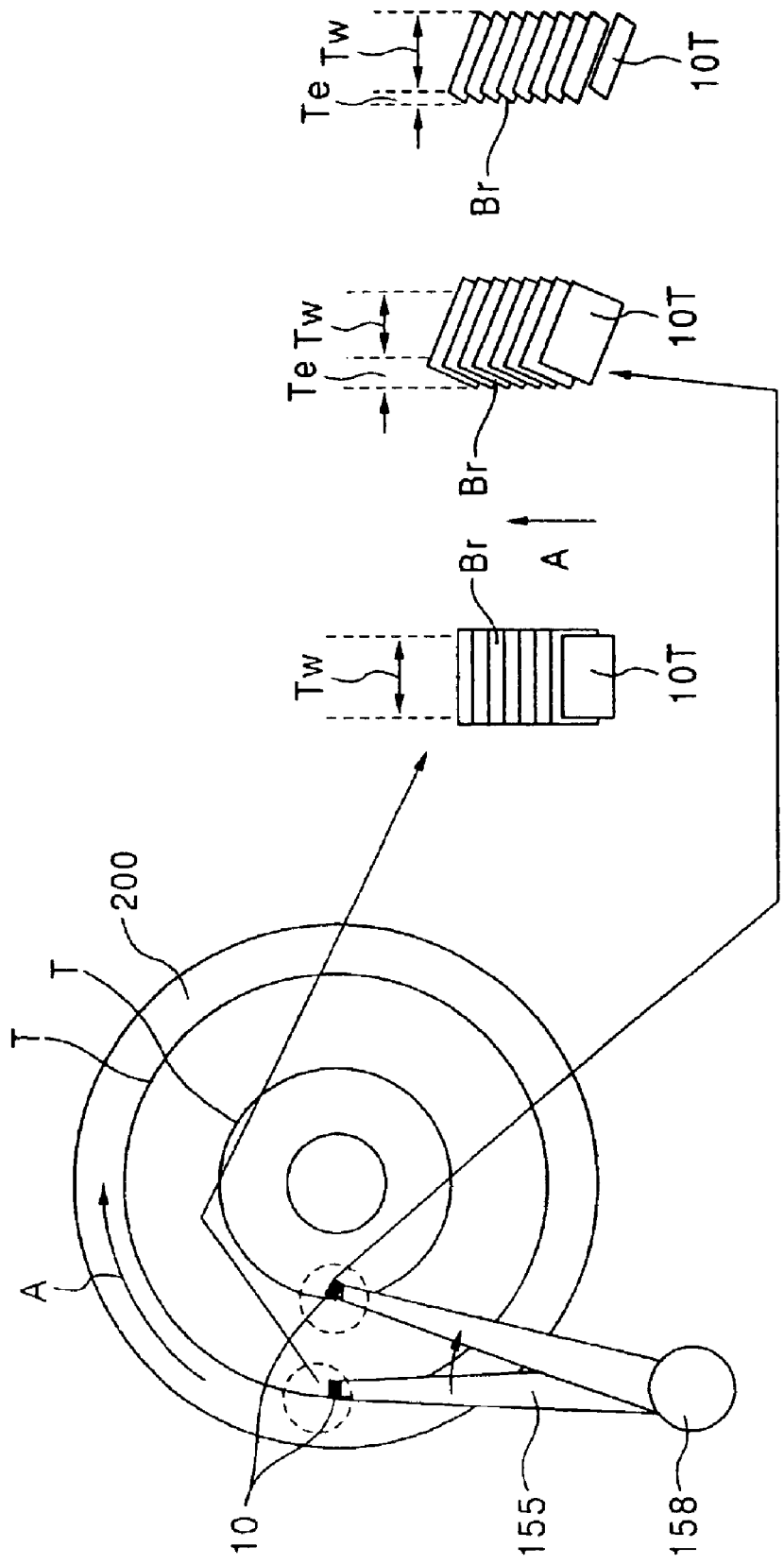

006# METHOD A FABRICATING A MAGNETIC HEAD

The present application is a divisional of U.S. application Ser. No. 09/668,343, filed Sep. 25, 2000, now abandoned, the contents of which are incorporated herein by reference.

BACKGROUND OF THE INVENTION

The present invention relates to a magnetic head, a fabrication method therefor, and a magnetic storage device. More specifically, the present invention relates to a magnet head for recording or reproduction with respect to a perpendicular magnetic storage medium, which is used mainly in applications such as a hard disk drive (HDD), together with a method of fabrication thereof and a magnetic storage device.

The densities achieved by magnetic recording/reproduction devices such as hard disk drives are rapidly increasing, and 40 to 100 Gbpsi (gigabits/inch$^2$) is becoming the next target for a real storage densities. Any attempt to achieve such storage densities by using a conventional in-plane recording method (longitudinal recording method) will make it highly likely that the magnetically recorded data will be destroyed by thermal effects, due to a problem called thermal instability. That is why perpendicular recording methods are considered to be advantageous.

The resistance of a medium to thermal instability is proportional to the product of its magnetic energy Ku per unit volume and the volume V of particles. To increase the linear storage density with an in-plane recording method, it is necessary to reduce the film thickness of the medium in order to reduce the diamagnetic flux of the magnetized medium. This reduces the volume V, which reduces the thermal instability resistance. The magnetic energy Ku per unit volume could be increased in order to prevent this, but that would increase the antimagnetic power, making recording difficult.

With a perpendicular recording method, on the other hand, the direction of magnetism is in the thickness direction of the medium, so that it is not necessary to reduce the film thickness of the medium and thus there can be a favorable thermal instability resistance even with a comparatively small value of Ku, making it easy to achieve a higher density.

However, to achieve an even higher surface density with the perpendicular recording method, it is necessary to increase Ku anyway. Studies performed by the present inventors have proved that there are structural problems with prior-art recording heads, relating to the fabrication of a recording head that can obtain a large flux in a stable manner. This problem is described in detail below.

A schematic view showing a section through the structure of a prior-art perpendicular recording/reproduction magnetic head is shown in FIG. 12. In this figure, a magnetic head 100A for recording and a magnetic head 100B for reproduction are shown in a state in which they are positioned above a medium 200.

The recording head 100A has a configuration such that an annular magnetic path is formed by a main magnetic pole 111, an auxiliary magnetic pole 112, a return yoke 113, and a soft-magnetic underlayer film 216 that is provided on the storage medium 200, and a recording coil 114A is provided so as to intersect this magnetic path.

Similarly, the reproduction head 100B has a configuration such that an annular magnetic path is formed by a main magnetic pole 111, an auxiliary magnetic pole 112, a return yoke 113, and the soft-magnetic underlayer film 216 provided on the storage medium 200, and a reproduction coil 114B is provided so as to intersect this magnetic path.

The return yoke 113 of the recording head 100A is formed of a soft magnetic film that is superimposed on top of a substrate S. The return yoke 113 of the reproduction head 100B, on the other hand, is formed of a substrate S which is itself formed of a soft magnetic material.

A lubrication film 117 of a substance such as diamond-like carbon (DLC) is provided on a medium-facing surface 118 that faces the medium 200.

In the recording head 100A, a current passing through the recording coil 114A causes a large amount of magnetic flux to be generated by the comparatively thick auxiliary magnetic pole 112. This is concentrated in the main magnetic pole 111 so that a large flux escapes to the medium 200 to magnetize a perpendicular recording layer 215 and thus record information. Note that a bias layer 218 is provided in the medium 200.

In the reproduction head 100B, reproduction is done by detecting an induction current that is generated in the reproduction coil 114B provided so as to cross the annular magnetic path.

To ensure that a sufficiently large amount of flux is supplied to the main magnetic pole 111 in the recording head 100A, it is necessary to make the auxiliary magnetic pole 112 thicker than the main magnetic pole 111. If the distance from the medium 200 to the auxiliary magnetic pole 112 is made to be substantially the same as the distance from the medium to the main magnetic pole 111, it becomes difficult for the magnetic flux to concentrate in the main magnetic pole 111 and it also becomes impossible for a large amount of flux to escape. For that reason, it is necessary to arrange the auxiliary magnetic pole 112 in a state in which it is recessed (offset) by a very small amount (indicated by reference letter L in the figure) from the surface that faces the medium 200.

It is also necessary to recess the return yoke 113 with respect to the medium-facing surface, to ensure that nothing is recorded on the medium due to flux concentrations at corner portions thereof.

In contrast thereto, the protruding part of the main magnetic pole 111 is formed to be narrow so that flux is concentrated therein, and thus it has a high magnetic resistance. Since a large amount of magnetic flux flows within the main magnetic pole 111 and thus a large amount of flux escapes from the tip thereof, it is necessary to make the protruding part of the main magnetic pole 111 as short as possible to reduce its magnetic resistance. In other words, the auxiliary magnetic pole 112 and the return yoke 113 ought to be as close to the medium 200 as possible, while still being recessed therefrom. Of course, the closer that the recording coil 114A is to the perpendicular recording layer 215, the larger is the flux that is generated at the tip of the main magnetic pole 111.

To summarize the above discussion: to increase the magnetic strength for recording with respect to the medium, it is necessary to place all of the auxiliary magnetic pole 112, the return yoke 113, and the recording coil 114A as close as possible to the medium 200, while ensuring that they are recessed by an extremely small amount from the main magnetic pole 111. The situation of the reproduction head 100B is similar.

With the prior-art perpendicular magnetic heads 100A and 100B exemplified in FIG. 12, however, structural constraints make it difficult to fabricate a stable assembly that satisfies these requirements in a satisfactory manner.

The description now turns to a simplified version of the process of fabricating the magnetic head 100A for recording.

The return yoke 113, the recording coil 114A, the main magnetic pole 111, and the auxiliary magnetic pole 112 are deposited and patterned in that order on a substrate S. The resultant stack of film layers is then sliced in a direction perpendicular to the film surface and the cut surface is lapped to form the medium-facing surface 118. Finally, the DLC lubrication film 117 is formed to complete the recording head 100A.

However, errors in the lapping step during the formation of the medium-facing surface 118 are on the order of ±0.15 μm. This means that, if the aim is to recess the edge positions of surface of the auxiliary magnetic pole 112 that faces the medium 200 by an average of 0.15 μm, where this auxiliary magnetic pole 112 requires more accurate control, this recess could end up as being 0.3 μm in the worst case. If that happens, the flux strength generated from the main magnetic pole 111 is degraded to approximately 70% in comparison with an assembly with a recess of only 0.15 μm.

Furthermore, all of the return yoke 113, the recording coil 114A, the main magnetic pole 111, and the auxiliary magnetic pole 112 are formed by photolithography, combinations of patterning errors (±0.1 μm) and alignment errors (±0.2 μm) could lead to variations of the edge positions that are on the order of ±0.3 μm. If the lapping shaves off 0.15 μm in excess and the worst case is assumed, the position of the edges of the return yoke 113 will have to be recessed by approximately 0.9 μm to ensure that the return yoke 113 does not protrude into the medium-facing surface 118. In such a case, the recording flux strength will decay further, to approximately 90%. Similarly, if the recording coil 114A is displaced in the direction away from the medium 200, the generated flux strength will decay further to approximately 80%.

If it is assumed that all of these errors occur in the worst-case direction, the total error will end up as 0.7×0.9×0.8=0.5, halving the recording flux strength. In principle, the perpendicular magnetic recording method has the advantage of resistance to thermal instability, but a drop in the recording flux strength would make it more likely for data to be lost due to thermal effects, so that this advantage is lost in practice.

SUMMARY OF THE INVENTION

The present invention was devised in the light of the above described problems. In other words, an objective thereof is to provide a magnetic head, a fabrication method therefor, and a magnetic storage device that make it possible to increase the flux generated thereby in a stable manner, by imposing accurate and reproducible control over the amount by which each of the main magnetic pole, the auxiliary magnetic pole, the coil, and the return yoke are recessed from the medium-facing surface to an extremely small value on the order of 0.05 to 0.1 μm.

The present invention configures a magnetic head from a stack of magnetic elements in thin-film form on a thin film provided parallel to a medium-facing surface. An aperture is formed in the thin film and part of the main magnetic pole is formed to have a tip portion that extends into this aperture. In this case, "magnetic element" refers to the main magnetic elements of the magnetic head, which include a main magnetic pole, a thin-film return yoke, and are cording coil if the magnetic head is for recording, or a main magnetic pole, a thin-film magnetic yoke, and a detection element such as a GMR element if the magnetic head is for reproduction.

The present invention makes it possible to impose highly accurate control over the amount by which thin-film-shaped magnetic elements such as the auxiliary magnetic pole portion, thin-film return yoke, and thin-film coil are recessed from the medium-facing surface, while simultaneously exerting accurate control over the amount of protrusion of the main magnetic pole tip portion by making the thickness of the thin film extremely small. As a result, the recording flux strength at the main magnetic pole tip portion can be increased to the ultimate value thereof, making it possible to supply a head that can record on a high coercive force medium suitable for higher densities.

According to the invention, there is provided a magnetic head for recording magnetic information onto a perpendicular magnetic storage medium, comprising: a first film having a main surface facing the perpendicular magnetic storage medium and a rear surface on the back of the main surface, with an aperture extending from the main surface to the rear surface; and a main magnetic pole having a pole tip disposed into the aperture.

According to the invention, there is provided another magnetic head for reproducing magnetic information from a perpendicular magnetic storage medium, comprising: a first film having a main surface facing the perpendicular magnetic storage medium and a rear surface on the back of the main surface, with an aperture extending from the main surface to the rear surface; and a first magnetic yoke having a yoke tip disposed into the aperture.

In other words, a magnetic head in accordance with the present invention relates to a magnetic head for either recording magnetic information onto a perpendicular magnetic storage medium or reproducing recorded magnetic information therefrom, wherein the magnetic head comprises: a first film having a main surface facing the perpendicular magnetic storage medium and a rear surface on the back of the main surface, with an aperture extending from the main surface to the rear surface; a main magnetic pole having a tip portion disposed into the aperture; and a thin-film magnetic element that is a thin-film magnetic element for providing magnetic coupling with the main magnetic pole, where-one surface thereof has an end portion in contact with the rear surface.

In other words, this forms a thin-film magnetic element that configures a head on top of a thin film, with a main magnetic pole or a magnetic yoke disposed into the aperture of the thin film. In this case, "end portion" means a portion of the magnetic yoke or the auxiliary magnetic pole on the side of the medium-facing surface.

The present invention configured as described above has the effect discussed below.

First of all, the present invention makes it possible to ensure a parallel positional relationship between the film surfaces of the thin films that configure the thin-film head and the medium surface, thus making it possible to use the thicknesses of thin films formed on the medium-facing surface to regulate the amount by which the auxiliary magnetic pole is recessed, the amount by which the thin-film return yoke is recessed, and the amount by which the coil is recessed. Since the thickness of a thin film can be regulated accurately to be on the order of 0.01 μm, it is possible to form an extremely highly efficient magnetic path, so that the magnetic flux generated in the thin-film recording coil of a recording system can be concentrated in a highly efficient manner in the main magnetic pole tip portion, and thus the recording flux strength at the medium-side end of the main magnetic pole tip portion can be increased to the ultimate value thereof, making it possible to supply a head that can record on a high retention force medium suitable for higher densities.

Similarly, the magnetic flux from the medium can be guided efficiently into a GMR or TMR multi-layer element, so that a large output can be obtained.

It should be obvious that the above described amount of recess can be controlled by insulation films other than a DLC film. In addition, since it is possible to dispose a comparatively thick DLC film around the main magnetic pole tip portion without increasing the distance between the main magnetic pole tip portion and the medium too far, the DLC film is hardly ground away and the reliability of contact travel can be greatly improved, even if a small amount of abrasion is generated during this contact travel.

The present invention also makes it possible to form a slider that has a complicated "aero-pattern", at the same time as the magnetic head. As a result, the fabrication costs can be greatly reduced Furthermore, the present invention makes it possible to fabrication a main magnetic pole tip portion that is much smaller than in the prior art, inexpensively. In other words, direct imaging that is done conventionally by focused ion beam (FIB) or electron beam (EB) etching is suitable for very fine machining, but it has an extremely bad throughput and thus it is not used for the mass-production of devices such as sliders. In contrast thereto, the present invention regulates the main magnetic pole tip portion by the aperture formed in a DLC film, so that only the cutout pattern that defines the aperture need be exposed or machined. Since the surface area of this aperture is 1/10000th or less than the element surface area, focused ion beam (FIB) etching or electron beam (EB) direct imaging can be used therefor, making it possible to form an extremely small magnetic pole that could not be obtained in the past. As a result, it is possible to reduce the size of recorded bits to less than that in the are, enabling a huge increase in storage densities.

As described above, the present invention makes it possible to implement a highly reproducible perpendicular recording/reproduction magnetic head that has good recording and reproduction efficiencies, while suppressing thermal instability, which is advantageous from the manufacturing point of view.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1C is a schematic view of a magnetic head loaded onto a medium 200 by a rotary actuator 158;

DETAILED DESCRIPTION OF THE PREFERRED EMBODIMENTS

Embodiments of the present invention are described in detail below, with reference to the accompanying drawings.

Figure 1A:
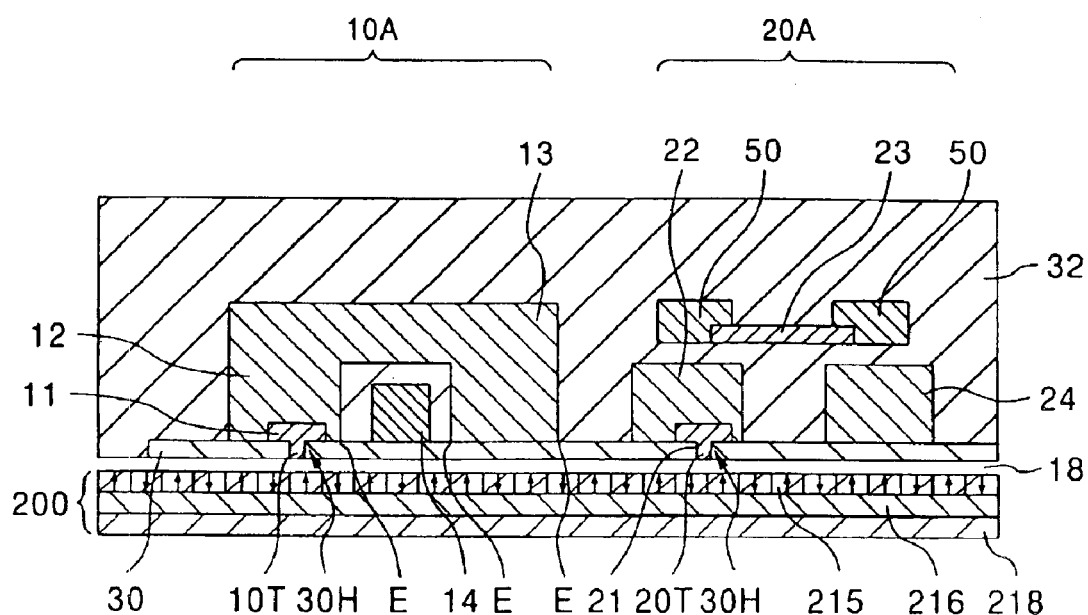
FIG. 1A is a schematic view of a section through the structure of a perpendicular magnetic head in accordance with the present invention.

A schematic view of a section through a perpendicular magnetic head in accordance with the present invention is shown in FIG. 1A. In this figure, a magnetic head 10A for recording and a magnetic head 20A for reproduction in accordance with the present invention are shown in a state where they are disposed above the medium 200. Note that the lateral direction in the figure is the direction along the recording track and the direction perpendicular to the plane of the figure corresponds to the widthwise direction across the recording track. A stack of the bias layer 218, the soft-magnetic underlayer film 216, and the perpendicular recording layer 215 is shown as the medium 200, by way of example. The bias layer 218 could be made of PtMn, the soft-magnetic underlayer film 216 could be of NiFe, and the perpendicular recording layer 215 could be of CoCrPt, by way of example.

The magnetic head 10A for recording in accordance with the present invention has thin-film magnetic elements 11 to 14 that are deposited in a stack on top of a thin film 30. More specifically, an annular magnetic path is formed by a main magnetic pole tip portion 11, an auxiliary magnetic pole portion (body of a main magnetic pole) 12, a thin-film return yoke portion 13, and the soft-magnetic underlayer film 216 provided on the medium 200, and a thin-film recording coil 14 is provided so as to intersect this magnetic path. The gaps between these components could be maintained and insulated by an isolation film 32 formed of a material such as aluminum oxide.

The thin film 30 has a medium-facing surface 18, which is the main surface thereof facing the perpendicular magnetic storage medium 200, and a rear surface on the other side thereof. The thin film 30 could be configured of a diamond-like carbon (DLC) lubrication film that is provided parallel to the medium-facing surface 18. The film surfaces of the thin-film magnetic elements 11 to 14 that form the head are also disposed so as to be parallel to the medium 200. The thin-film magnetic elements 11 to 14 that configure the head are provided at specific positions on a rear surface of the DLC lubrication film 30 (the surface thereof that is on the opposite side from the medium-facing surface 18). An aperture 30H is provided in the DLC lubrication film 30, and the pole tip 10T fills this aperture 30H, with the end surface thereof being formed so as to extend as far as the same level as the lower surface of the DLC lubrication film 30. In other words, the main magnetic pole has the pole tip 10T which protrudes into the aperture 30H and a body 12 formed on the rear surface of the film 30. Thus, the amount of protrusion of the pole tip 10T is controlled accurately by the film thickness of the DLC lubrication film 30 (on the order of 0.1 $\mu$m, by way of example). In other words, the body 12 of the main magnetic pole is recessed from the end surface of the pole tip 10T by an amount that is regulated by the thickness of the film 30.

All of the auxiliary magnetic pole portion 12, the thin-film return yoke portion 13, and the thin-film recording coil 14 are provided so as to be positioned on the rear surface of the diamond-like carbon (DLC) lubrication film 30. In other words, Each of these thin-film magnetic elements has an end portion that is in contact with the rear surface of the film 30. As a result, the amount by which each of this components is recessed with respect to the medium 200 is controlled accurately by the thickness of the DLC lubrication film 30.

The present invention specifies that the thin films configuring the magnetic head 10A are disposed in such a manner that surfaces thereof are parallel to the medium 200. This makes it possible to use the thickness of the thin DLC lubrication film 30 that is deposited on the medium-facing surface side in an accurate and also simple manner to regulate the amount by which components are recessed, such as the position of an edge on the medium-facing side of the auxiliary magnetic pole portion 12, the position of an edge E on the medium-facing side of the thin-film return yoke portion 13, and the position of an edge E on the medium-facing side of the recording coil 14. Since the thickness of the thin film 30 can be controlled accurately to be on the order of 0.01 $\mu$m, it is possible to exert extremely accurate control over the amount by which the auxiliary magnetic pole portion 12, the thin-film return yoke portion 13, and the recording coil 14 are recessed, and also increase the recording flux strength to the ultimate value thereof.

Note that it is preferable to round the edges E of the auxiliary magnetic pole portion 12 and the thin-film return yoke portion 13 on the medium-facing sides thereof. This is because, if they were not rounded, the component of magnetic flux escaping into the medium from those edges E would increase, resulting in the recording of unwanted signals on the medium.

Figure 1B:
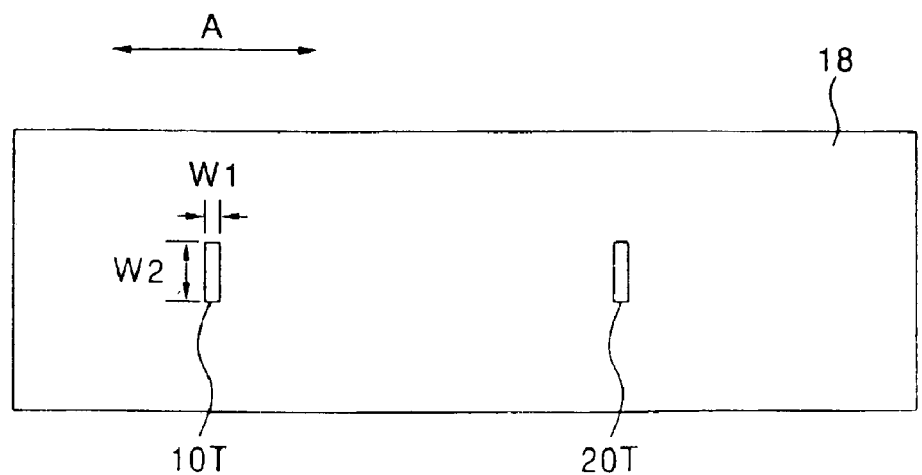
FIG. 1B is a plan view of the magnetic head of FIG. 1A as seen from the medium-facing surface side.

A plan view of the magnetic head of FIG. 1A as seen from the medium-facing surface side is shown in FIG. 1B. As shown in this figure, the dimensions of the pole tip 10T of the recording head are preferably such that the length W1 thereof in the medium-traveling direction A is less than the length width W2 thereof in the track width direction. The reasons therefor are discussed below.

The magnetic head 10 which is mounted on the tip of the actuator arm 155 is loaded onto the medium (disk) 200 by a rotary actuator 158, as shown in FIG. 1C, and is disposed on top of a predetermined track T to perform recording or reproduction. The disk 200 is rotated in a direction shown by the arrow A. As far as possible, it is preferable to record magnetic information along the circumferential direction of the track. However, the movement of the magnetic head due to the rotary actuator 158 will cause the pole tip 10T of the magnetic head to deviate by a few degrees from the direction parallel to the circumferential direction as it travels from the inner peripheral portion to the outer peripheral portion of the disk medium 200. If the pole tip 10T is arranged to be parallel to the track circumference at the outer peripheral portion of the disk 200, the orientation of the pole tip 10T will deviate from the circumferential direction of the track as the magnetic head moves towards the inner peripheral side. Thus, the recording bits Br are formed in a slant direction.

With perpendicular recording, information is recorded on the medium by the trailing edge of the pole tip 10T (on the downstream side in the direction of rotation of the medium), but if the pole tip 10T is no longer parallel to the circumferential direction of the track, recording will also occur at one of the side surfaces of the pole tip 10T and edge noise will result.

In addition, the effective track width Tw becomes narrower by a factor of cosine of the angle $\theta$ of deviation.

In contrast thereto, if the dimension W1 of the pole tip 10T is made narrower, the region of edge noise will also become narrower and thus it would be possible to move adjacent tracks closer. To increase the density, it is desirable to make the length W1 of the main magnetic pole approximately 1/10 of the width W2 thereof.

The description now turns to the magnetic head 20A for reproduction in accordance with the present invention, having a configuration such that an annular magnetic path is formed by a main magnetic pole tip portion 21, a thin-film magnetic yoke 22, a detection element 23, a thin-film magnetic yoke 24, and the soft-magnetic underlayer film 216. If a magnetoresistance-effect element such as a giant magnetoresistive (GMR) or tunneling magnetoresistive (TMR) element is used as the detection element 23, a highly sensitive reproduction head can be implemented.

In the magnetic reproduction head 20A in accordance with the present invention, the yoke tip 20T fills the aperture 30H that is provided in the DLC lubrication film 30, and the end surface thereof is formed to extend as far as the same level as the lower surface of the DLC lubrication film 30. That is, the magnetic yoke 22 has the yoke tip 20T which protrudes into the aperture 30H and the body formed on the rear surface of the film 30. Each of the body of thin-film magnetic yoke 22 and the magnetic yoke 24 is disposed at a suitable position on the upper surface of the lubrication film 30. In other words, the amount of protrusion of the yoke tip 20T is controlled accurately by the thickness of the lubrication film 30 and, at the same time, the amount by which the body of the thin-film magnetic yoke 22 and the magnetic yoke 24 are recessed is also controlled accurately by the thickness of the lubrication film 30. Thus the positional relationships between the various components can be controlled in an accurate and also simple manner, as described previously with reference to the magnetic head 10A, making it possible to fabricate a high-sensitivity head at a high level of reproducibility.

The method of fabricating the magnetic heads 10A and 20A of the present invention will now be described.

Schematic sections illustrating the method of fabricating magnetic heads in accordance with the present invention are shown in FIGS. 2A through 3D.

Figure 2A:
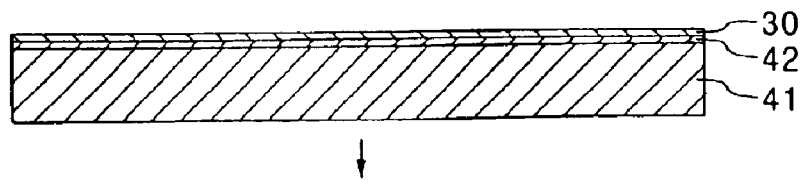
FIGS. 2A through 2E are sections illustrating steps in a method of fabricating a magnetic head in accordance with the present invention.

First of all, a film of a material that dissolves readily in an acid or alkali, such as copper (Cu) is formed as the peeling layer 42 on a substrate 41 of a material such as silicon (Si), and the DLC lubrication film 30 is formed thereon, as shown in FIG. 2A.

Figure 2B:
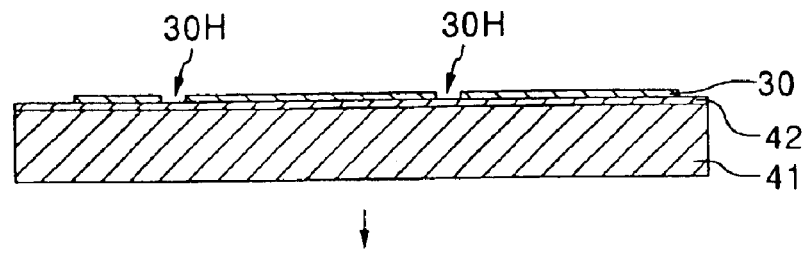

The apertures 30H are then formed in the DLC lubrication film 30, as shown in FIG. 2B. More specifically, a mask (not shown in the figure) is formed by a method such as focused ion beam (FIB) etching, exposure by excimer laser, or electron beam (EB) direct imaging, then reactive etching is used to form the apertures 30H having dimensions on the order of 0.15 $\mu$m×0.15 $\mu$m.

Figure 2C:
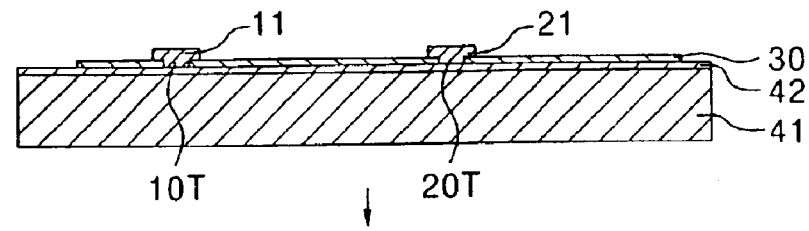

The main magnetic pole tip portions of the magnetic heads are then formed, as shown in FIG. 2C. More specifically, each of the main magnetic pole tip portions 11 and 21 is formed by a method such as plating with FeCo and NiFe, respectively, within the apertures 30H and is then patterned. Thus, the pole tip 10T and the yoke tip 20T are formed.

Figure 2D:
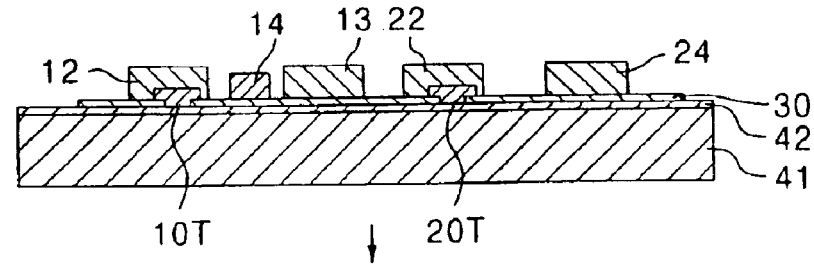

The auxiliary magnetic pole portion 12, the thin-film return yoke portion 13, and the thin-film magnetic yokes 22 and 24 are then formed on top of the DLC lubrication film 30 by depositing a layer of a material such as NiFe by a method such as plating, then patterning it, as shown in FIG. 2D. The thin-film recording coil 14 is also formed by depositing a layer of a material such as Cu by a method such as plating, then patterning it.

Figure 2E:
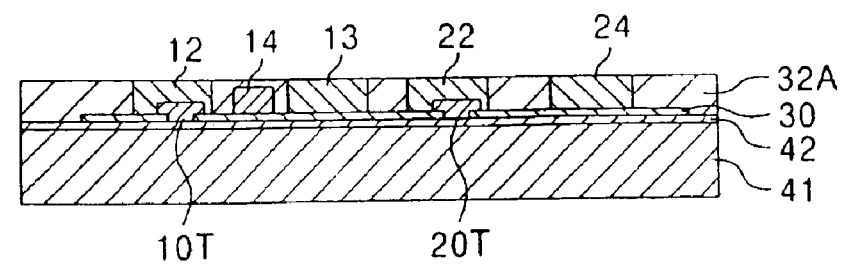

An isolation film 32A of a material such as aluminum oxide (AlOx) is then formed and flattened by chemical mechanical polishing(CMP), as shown in FIG. 2E.

Figure 3A:
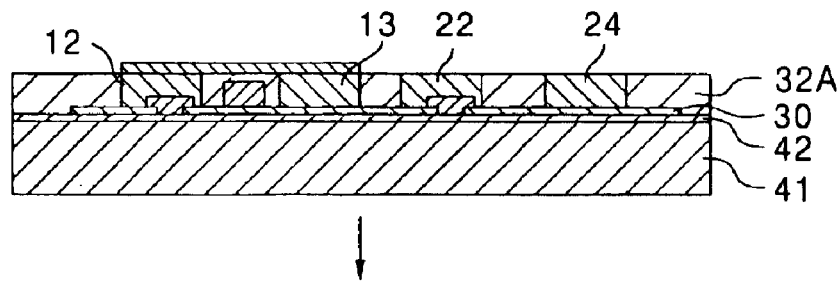
FIGS. 3A through 3D are sections illustrating further steps in the method of fabricating a magnetic head in accordance with the present invention.

The auxiliary magnetic pole portion 12 and the thin-film return yoke portion 13 of the magnetic head 10 are then coupled magnetically, as shown in FIG. 3A. More specifically, a material such as NiFe is deposited in a predetermined pattern.

Figure 3B:
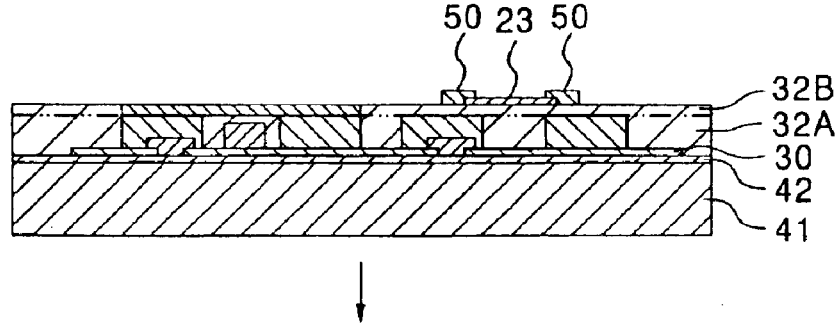

The detection element 23 of the magnetic head 20A is also formed, as shown in FIG. 3B. More specifically, an isolation film 32B of AlOx is first deposited and is flattened by CMP, then the detection element 23 that consists of a GMR element or TMR element is formed on top of the AlOx isolation film 32B for the reproduction head alone, on the right side of the figures.

Figure 3C:
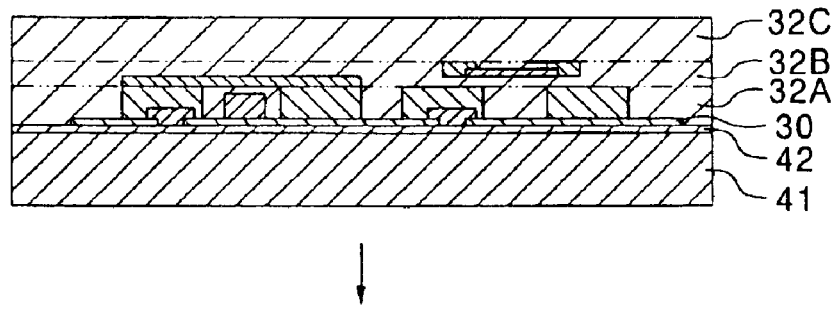

The entire assembly is then embedded in an isolation film, as shown in FIG. 3C. More specifically, an isolation film 32C of a material such as AlOx is formed and is flattened by CMP.

Finally, the entire substrate is immersed in an acid or alkali bath to dissolve the peeling layer 42 of Cu, or the like, thus removing the magnetic heads 10A and 20A from the substrate 41.

Note that if magnetic films in which domain control has been achieved by the deposition of antiferromagnetic layer are used for components such as the main magnetic pole tip portion 11, the auxiliary magnetic pole portion 12, and the thin-film return yoke portion 13, it is possible to obtain a magnetic head in which noise is suppressed. If the unidirectional anisotropy of the antiferromagnetic layer is diffused, they will become isotropic films and efficiency will also improve.

The fabrication method of the present invention as described above makes it possible to achieve accurate control over the amount by which the auxiliary magnetic pole portion 12, the thin-film recording coil 14, and the thin-film return yoke portion 13 of the recording head 10A are recessed from the medium-facing surface, by adjusting the thickness of the lubrication film 30 (on the order of 0.1 $\mu$m). Similarly, it is also possible to regulate the amount by which the thin-film magnetic yokes 22 and 24 and the GMR/TMR element 23 are recessed from the medium-facing surface, by adjusting the thickness of each thin film deposited on the substrate 41.

Note that end surfaces of the pole tip 10T and the yoke tip 20T of the magnetic heads 10A and 20A shown by way of example in FIG. 1A are on the same level as the lower surface of the DLC lubrication film 30. However, the present invention is not limited thereto and thus the end surfaces of the pole tip 10T and the yoke tip 20T could equally well be covered within the DLC lubrication film 30.

Figure 4:
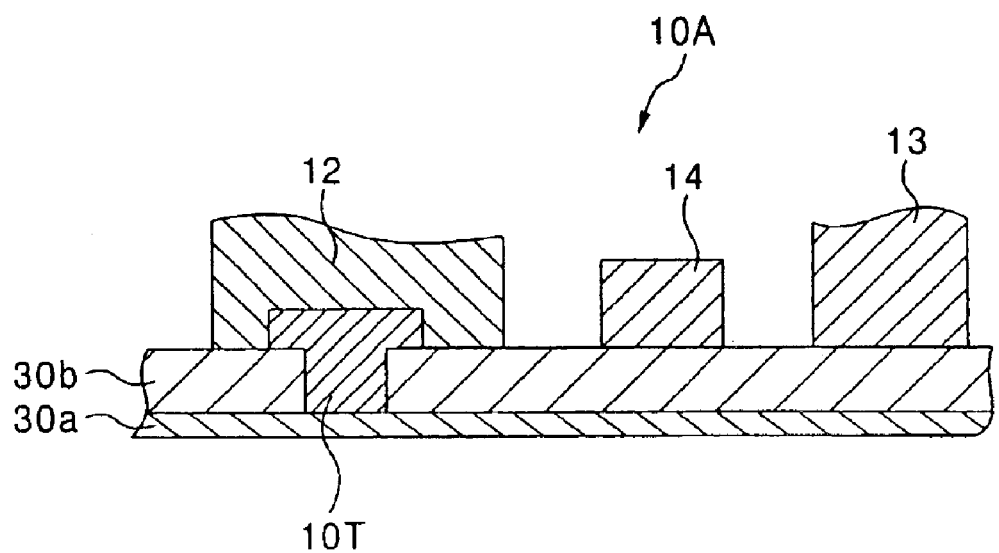
FIG. 4 is an enlarged section through essential components that exemplify a state in which a main magnetic pole tip portion is embedded.

An enlarged section through essential components that exemplify a state in which a pole tip 10T is covered in such a manner is shown in FIG. 4. In other words, the end surface of the pole tip 10T is covered by a lubrication film 30a. This configuration makes it possible to protect the end surface of the pole tip 10T and prevent abrasion due to contact with the medium or other causes.

This embedding if the pole tip 10T could be done by forming the aperture 30H not as a hole that penetrates as far as the peeling layer 42 during the formation of the aperture 30H in the DLC lubrication film 30 in the step described with reference to FIG. 2B, but as a hole formed only partway in the DLC lubrication film 30.

Figure 3D:
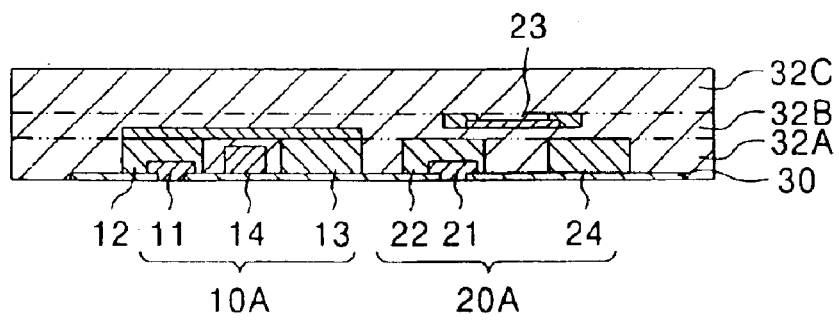

Alternatively, another DLC lubrication film 30a could be deposited to a predetermined thickness so as to cover the end surfaces of the pole tip 10T and the yoke tip 20T, after the separation from the substrate 41 shown in FIG. 3D. In such a case, the thin-film layer 30a is preferably configured of a DLC lubrication film but it is not always necessary for a thin film 30b to be configured of a DLC lubrication film. In other words, the material of the thin film 30b can be selected as suitable, from considerations such as compatibility with other components and simplification of the fabrication process.

The description now turns to variants of the present invention.

First of all, the present invention makes it possible to vary the amount by which each component is recessed, by providing a distribution of film thicknesses within the DLC lubrication film 30 that determines the amount by which each of the thin-film magnetic elements of the magnetic head is recessed.

Figure 5A:
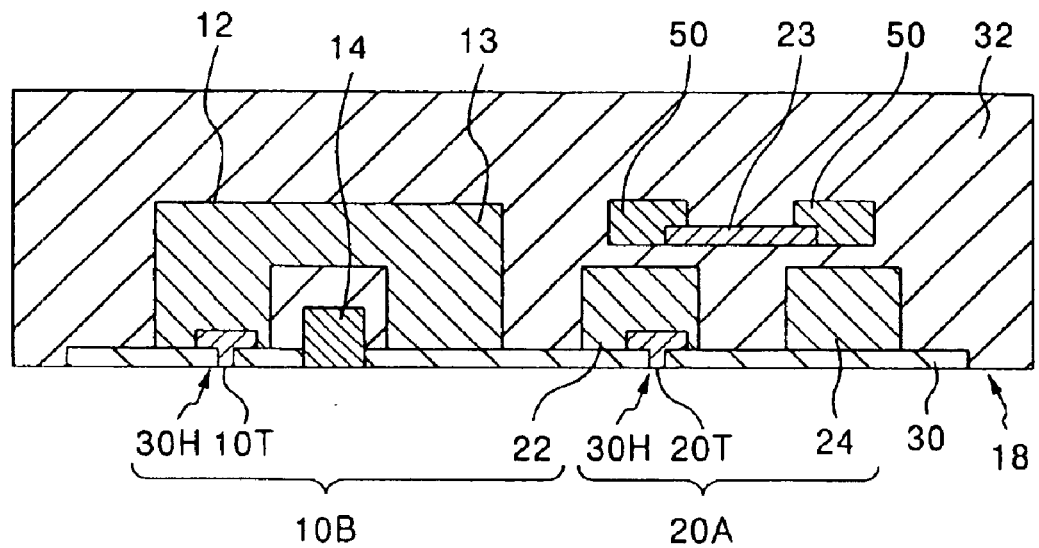
FIGS. 5A and 5B show schematic sections through a first variant of the present invention.
Figure 5B:
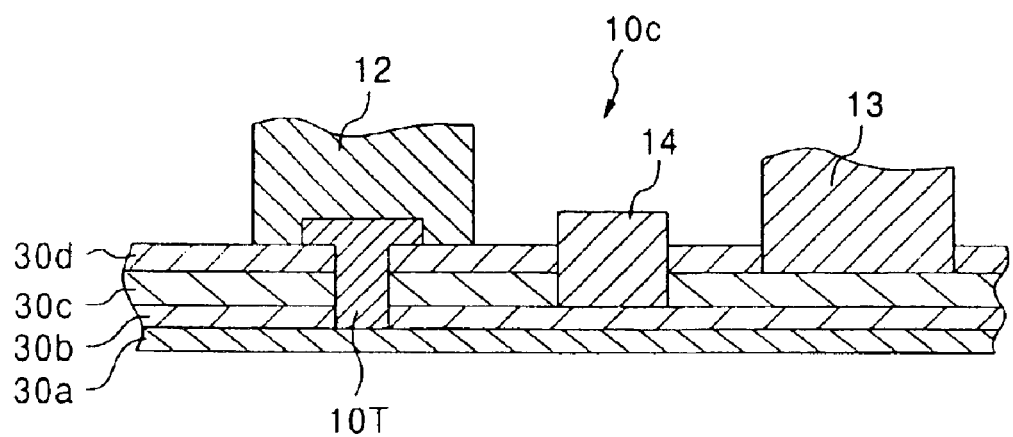

Schematic sections through a first variant of the present invention are shown in FIGS. 5A and 5B. Components in these figures that are the same as those described previously with reference to FIGS. 1A to 4 are given the same reference numbers and further description thereof is omitted.

In a magnetic head 10B shown in FIG. 5A, the amount by which the thin-film recording coil 14 is recessed is less than that of the auxiliary magnetic pole portion 12 and the thin-film return yoke portion 13. In other words, the thin-film recording coil 14 is disposed closer to the medium 200, making it possible to generate a larger recording flux at the end of the pole tip 10T.

In addition, an offset is achieved between the amounts by which different components are recessed by means of a step wise deposition of the DLC lubrication film 30, making it possible to vary the amounts of these recesses accurately.

FIG. 5B is an enlarged section through essential components that exemplify a magnetic head that is given an offset by using a plurality of lubrication films in this manner.

In other words, a magnetic head 10C shown in this figure is provided with four thin films 30a to 30d. The pole tip 10T is provided penetrating through the thin films 30b to 30d. The thin-film recording coil 14 is provided penetrating through the thin films 30c and 30d, the thin-film return yoke portion 13 is provided penetrating through the thin film 30d, and the auxiliary magnetic pole portion 12 is provided on top of the thin film 30d. The thin film 30a that is the lowermost layer of this stack acts as a protective film covering all the components.

In other words, each of the thin-film magnetic elements of the magnetic head 10C is given an offset that varies with the various thicknesses of the deposited thin films 30a to 30d, so that they are formed to have different amounts by which they are recessed from the medium-facing surface 18.

If a plurality of thin films are deposited in sequence in this manner, it is possible to accurately vary the amount by which each component of the magnetic head is recessed, by adjusting the thicknesses of those thin films.

In this case, one simple method of forming the configuration shown by way of example in FIG. 5B is to configure the plurality of thin films 30a to 30d of materials that have different etching characteristics. The thin film 30a that forms the lowermost layer could be configured of a DLC lubrication film, by way of example. The materials of the three thin films 30b to 30d deposited on top of the thin film 30a could differ as appropriate.

Assuming that the magnetic head is to be fabricated by a method such as that exemplified in FIGS. 2A through 3D, the thin films 30b to 30d are first deposited, then an aperture is formed through those three layers and the main magnetic pole tip portion 11 is formed therein. An aperture that penetrates the thin films 30c and 30d is then created by using a etching method such that the etching speed with respect to the thin film 30b is slow while the etching speed with respect to the thin films 30c and 30d is fast, and the thin-film recording coil 14 is formed therein. This selective etching is enabled by setting the materials of the thin films 30b to 30d and the type of the etching gas as appropriate.

Another aperture that penetrates the thin film 30d is then created by using a etching method such that the etching speed with respect to the thin film 30c is slow while the etching speed with respect to the thin film 30d is fast, and the thin-film return yoke portion 13 is formed therein.

If the materials of the thin films and the etching methods used thereon are set to ensure an increased range of etching selectivity, as described above, it becomes simple to form the multi-layer structure of thin films that is exemplified in FIG. 5B.

Figure 6A:
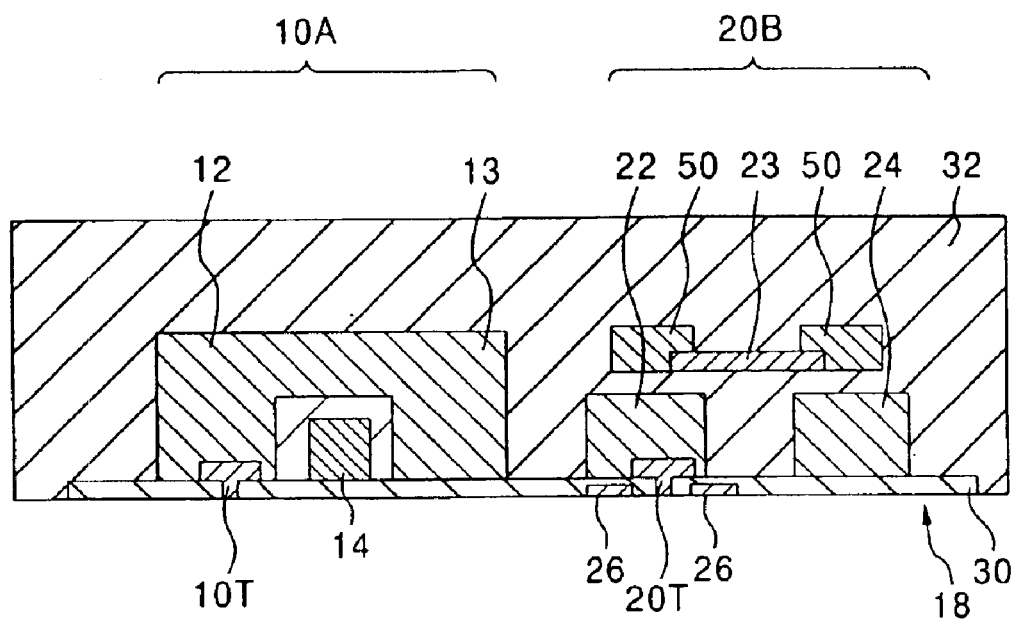
FIG. 6A shows a schematic section through a second variant of the present invention.

A schematic section through a second variant of the present invention is shown in FIG. 6A. In this figure too, components that are the same as those previously described with reference to FIGS. 1A to 5B are given the same reference numbers and further description thereof is omitted. A magnetic head 20B for reproduction that is shown in this figure has a pair of reproduction shields 26 on either side of the yoke tip 20T. These reproduction shields 26 are formed from a soft magnetic material and act to improve the spacial resolution by restricting the magnetic flux that flows from the medium to the yoke tip 20T. By forming these reproduction shields 26 on the opposite side of the lubrication film 30, it becomes possible to control the positional relationships with respect to the yoke tip 20T is an extremely accurate and also simple manner. This variant of the invention therefore makes it possible to dispose the reproduction shields at predetermined positions without reducing the signal flux needlessly, making it possible to efficiently shut out peripheral flux that causes noise.

Figure 6B:
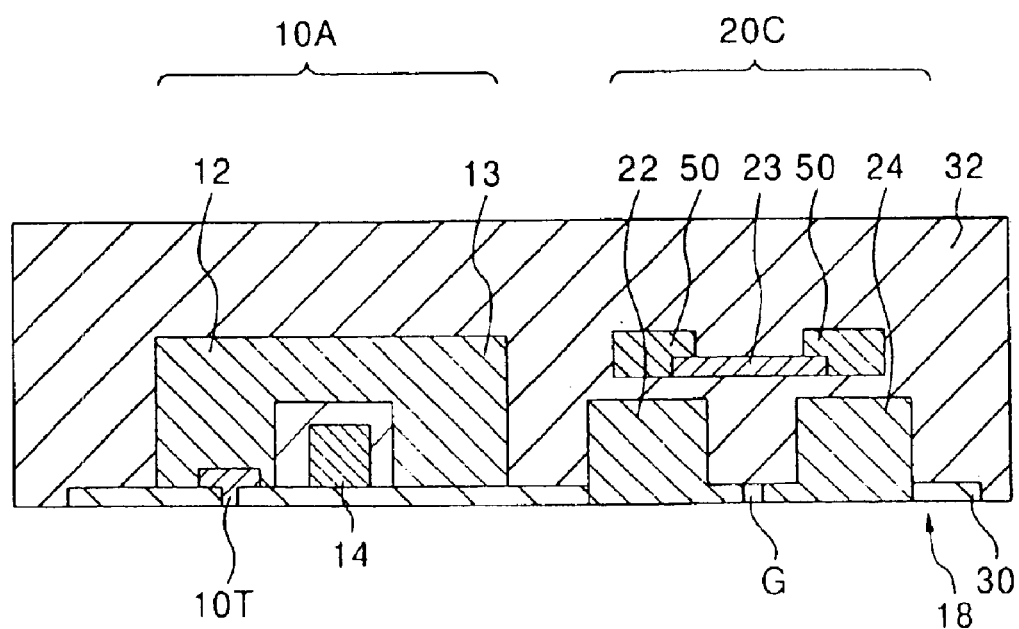
FIG. 6B shows a schematic section through a third variant of the present invention.

A schematic section through a third variant of the present invention is shown in FIG. 6B. In this figure too, components that are the same as those previously described with reference to FIGS. 1A to 6A are given the same reference numbers and further description thereof is omitted. A magnetic head 20C for reproduction that is shown in this figure has a pair of magnetic yokes 22 and 24 opposing to each other through the magnetic gap G. A magnetic flux from a recording bit (not shown) locating right beneath the gap G enters the magnetic circuite formed by the magnetic yoke 22, the detecting element 23 and the magnetic yoke 24, then is detected by the element 23.

Figure 6C:
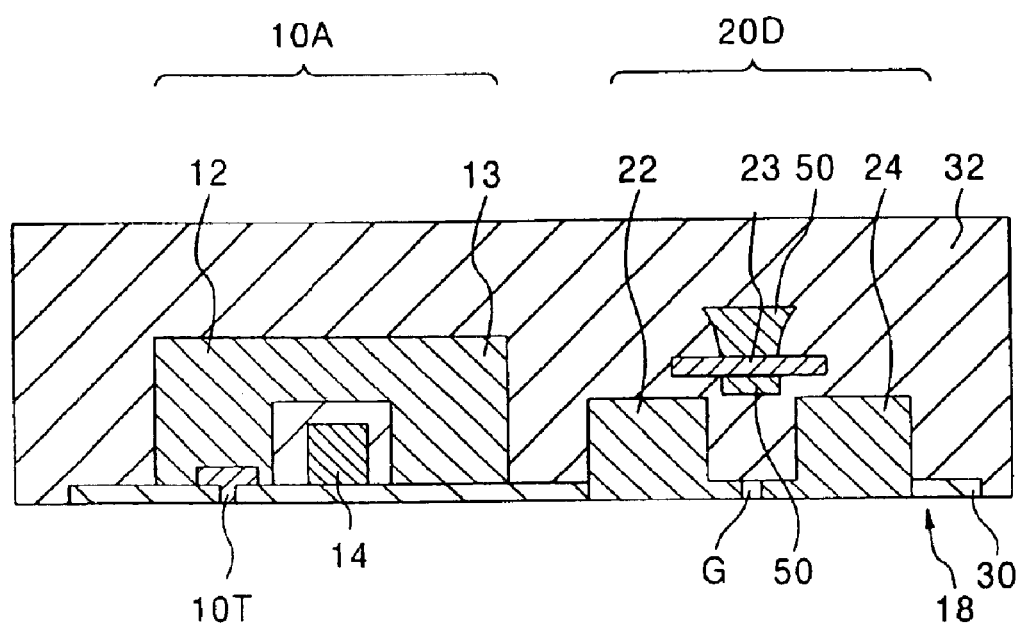
FIG. 6C shows a schematic section through a fourth variant of the present invention.

A schematic section through a fourth variant of the present invention is shown in FIG. 6C. In this figure too, components that are the same as those previously described with reference to FIGS. 1A to 6B are given the same reference numbers and further description thereof is omitted.

A magnetic head 20D for reproduction that is shown in this figure has a pair of magnetic yokes 22 and 24 opposing to each other through the magnetic gap G. A magnetic flux from a recording bit (not shown) locating right beneath the gap G enters the magnetic circuite formed by the magnetic yoke 22, the detecting element 23 and the magnetic yoke 24, then is detected by the element 23.

In the variant, each of the pair of leads 50, 50 is formed on the upper and lower surface of the element 23, respectively. Thus, a sense current is provided in a vertical direction through the element 23. This configuration makes it possible to confine the sense current to the most sensitive part of the element and improve the sensitivity of the element.

The magnetic head in accordance with the present invention as described above could be assembled into an integral recording/reproduction magnetic head or it could be installed in a magnetic recording/reproduction device.

Figure 7:
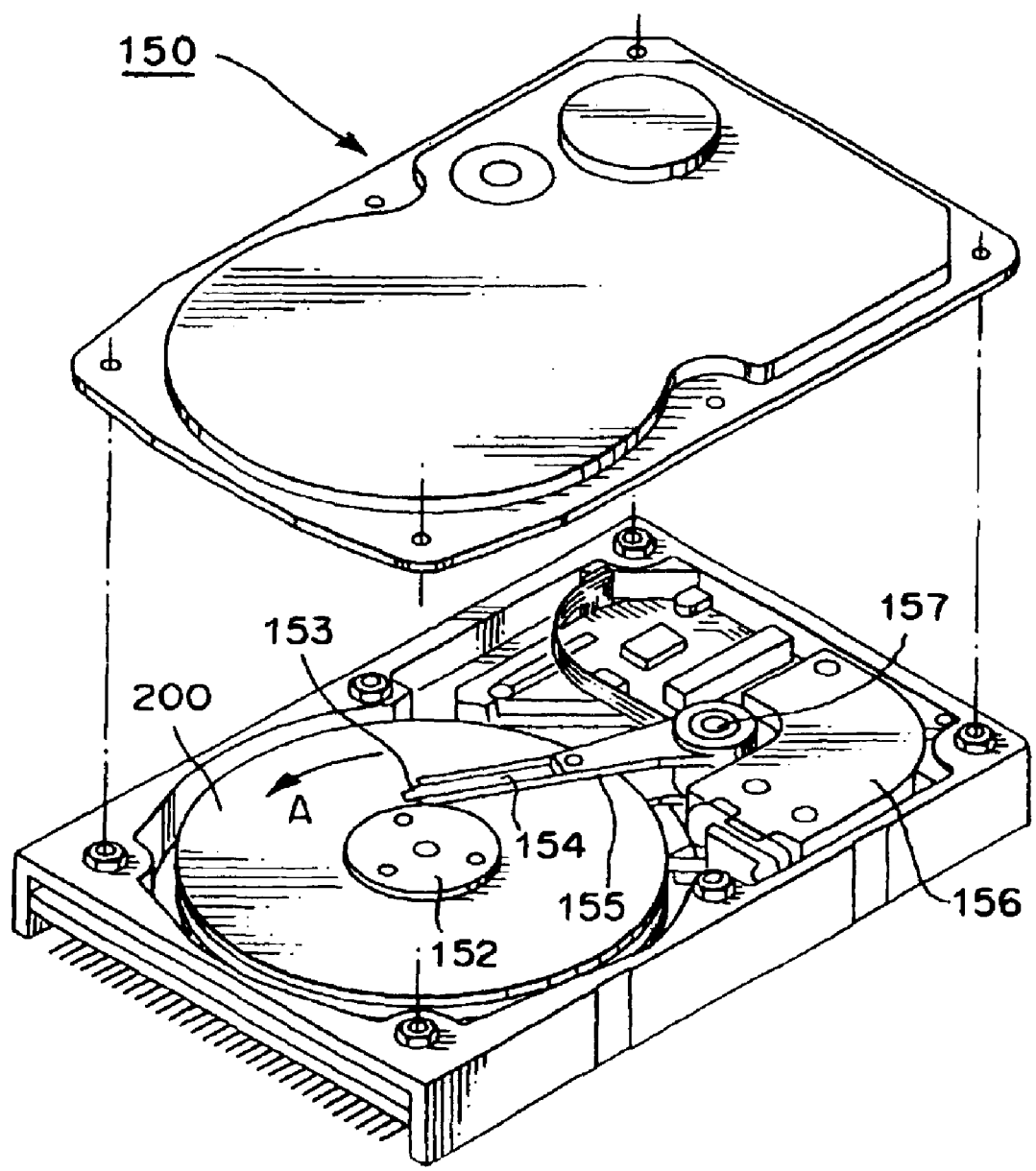
FIG. 7 is a perspective view of essential components that exemplify the structure of a magnetic recording/reproduction device.

A perspective view of essential components that exemplify the structure of such a magnetic recording/reproduction device is shown in FIG. 7. A magnetic recording/reproduction device 150 in accordance with this invention is a type of device that uses a rotary actuator. As shown in this figure, a magnetic disk 200 for perpendicular recording is mounted on a spindle 152 and is rotated by a motor (not shown in the figure) in response to control signals from a drive device control portion (also not shown in the figure). A head slider 153 for recording or reproducing information that is stored in the magnetic disk 200 is attached to a tip of a thin-film-shaped suspension member 154. In this case, a magnetic head in accordance with any of the previously described embodiments is mounted in the vicinity of the tip of the head slider 153.

When the magnetic disk 200 rotates, a medium-facing surface (ABS) of the head slider 153 is maintained at a predetermined float height from the surface of the magnetic disk 200.

The suspension member 154 is connected to one end of an actuator arm 155 having components such as a bobbin portion that retains a drive coil (not shown in the figure). A voice coil motor 156 that is a type of linear motor is provided at the other end of the actuator arm 155. The voice coil motor 156 is configured of a drive coil (not shown in the figure), which is wound around the bobbin portion of the actuator arm 155, and a magnetic path formed of a permanent magnet and an opposing yoke that are disposed so as to sandwich the coil.

The actuator arm 155 is retained by ball bearings(not shown in the figure) at two locations at the top and bottom of a fixed shaft 157 so that it can rotate freely in answer to the voice coil motor 156.

Figure 8:
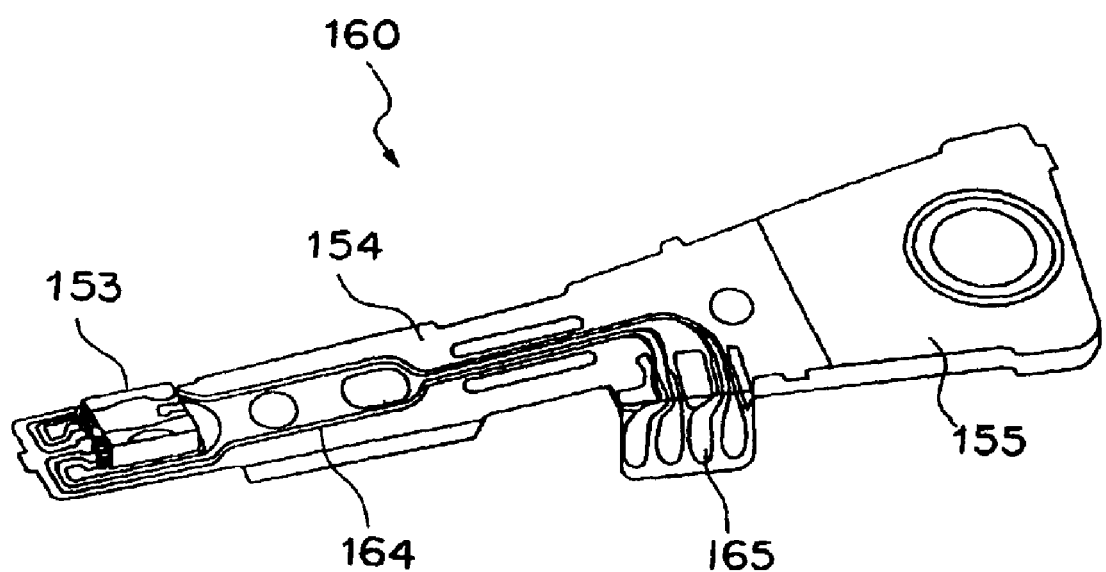
FIG. 8 is an enlarged perspective view of the magnetic head assembly from the actuator arm 155 onward, as seen from the disk side.

An enlarged perspective view of the magnetic head assembly from the actuator arm 155 onward, as seen from the disk side, is shown in FIG. 8. In other words, a magnetic head assembly 160 is provided with the actuator arm 155 that has components such as a bobbin portion for holding the drive coil, and the suspension member 154 is connected to the tip of the actuator arm 155.

The head slider 153, which is provided with a recording or reproduction head in accordance with any of the previously described embodiments, is attached to the head slider 153. The suspension member 154 has lead wires 164 for the reading and writing of signals, and these lead wires 164 provide electrical connections with electrodes of the magnetic head that are incorporated in the head slider 153. Reference number 165 in the figure denotes electrode pads for the magnetic head assembly 160.

In this case, a predetermined float height is set between the medium-facing surface (ABS) of the head slider 153 and the surface of the medium 200.

Figure 9A:
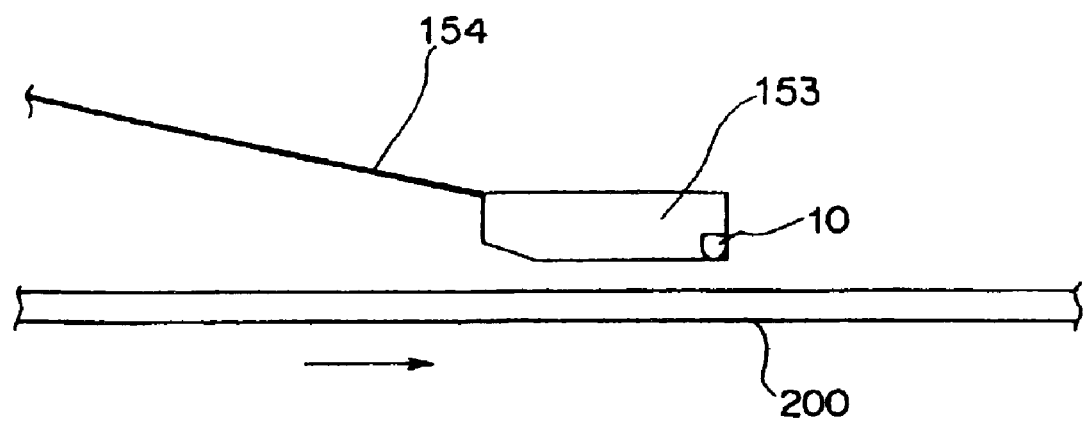
FIG. 9A is a schematic view of the relationship between the head slider 153 and the medium 200 when the float height is a predetermined positive value.

A schematic view of the relationship between the head slider 153 and the medium 200 when the float height is a predetermined positive value is shown in FIG. 9A. As shown by way of example in this figure, most magnetic recording/reproduction devices operate in a state in which the slider 153 in which is installed a magnetic head 10 floats a predetermined distance from the surface of the medium 200. The present invention enables the recording and reading of low noise levels with a higher sensitivity that in the prior art, even with such a "floating-travel" type of magnetic recording/reproduction device. In other words, use of the magnetic head in accordance with any of the above described embodiments of the invention makes it possible to maintain optimal conditions for the positional relationships between the main magnetic pole tip portion, the auxiliary magnetic pole, and other components such as the thin-film magnetic yoke, making it possible to record signals on the medium (magnetic disk) 200 with a high sensitivity but a low level of noise, and also reproduce a signal magnetic flux therefrom. In other words, it is possible to implement a high output and a higher sensitivity, thus increasing the storage density while suppressing thermal instability.

If the recording density is to be increased even further, on the other hand, it is necessary to lower the floating height and make the head glide closer to the magnetic disk 200 to retrieve information. To obtain a recording density on the order of 30 gigabits per square inch, for example, spacing losses due to the floating itself would be too great, and the problem of crashing between the low-floating head 10 and the magnetic disk 200 can no longer be ignored.

For that reason, a converse method that could be considered would have the magnetic head 10 and the magnetic disk 200 placed in active contact so that they travel relative to each other in that state.

Figure 9B:
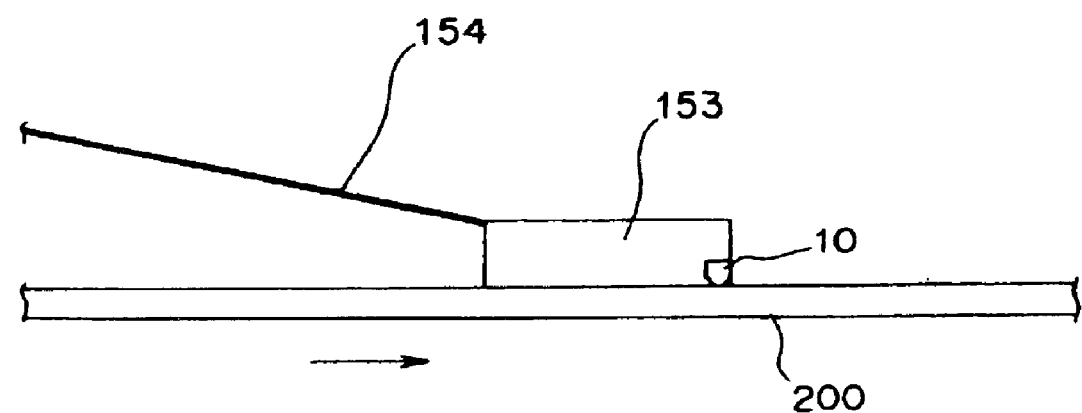
FIG. 9B is A schematic view of the relationship between the head slider 153 and the magnetic disk 200 in a "contact-travel" type of motion.

A schematic view of the relationship between the head slider 153 and the magnetic disk 200 in this "contact travel" type of motion is shown in FIG. 9B. The magnetic head in accordance with this aspect of the invention is provided with a DLC lubrication film and the recording coil or a magnetoresistance-effect element is separated from the magnetic disk by a predetermined distance. It is therefore possible maintain the positional relationships between the main magnetic pole tip portion, the auxiliary magnetic pole, and other components such as the thin-film magnetic yoke, to achieve high-density recording/reproduction that is even more stable than in the prior art, even with the "contact-travel" type of magnetic recording/reproduction device shown in FIG. 9B.

In addition, the present invention makes it possible to form this type of low-floating slider in a simple fashion.

Figure 10:
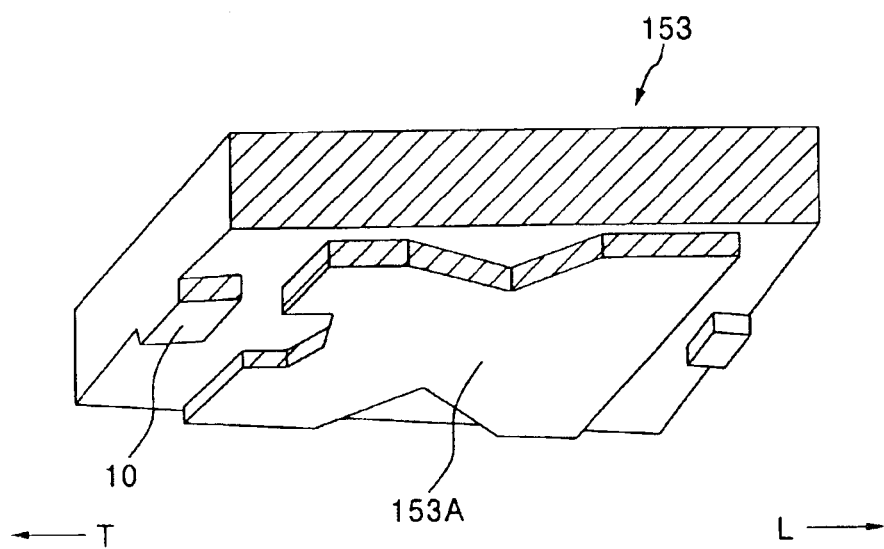
FIG. 10 is a schematic perspective view of a head slider 153 as seen from a medium-facing surface.

A schematic perspective view of the head slider 153 as seen from the medium-facing surface is shown in FIG. 10. The magnetic head 10 is provided on a trailing side (rear side) of the head slider 153 in the medium-traveling direction and an "aero" pattern 153A is formed on a reading side (front side) thereof. This "aero" pattern 153A uses aero-mechanics to control the air flow in the vicinity of the medium that is generated by the motion of the medium in an optimum manner, and thus a specific shape and depth is necessary therefor.

The present invention makes it possible to form the "aero" pattern 153A simultaneously with the fabrication of the magnetic head. In other words, an inversion of the "aero" pattern 153A could be formed in the surface of the substrate 41 before the series of steps shown in FIGS. 2A through 3D.

Figure 11:
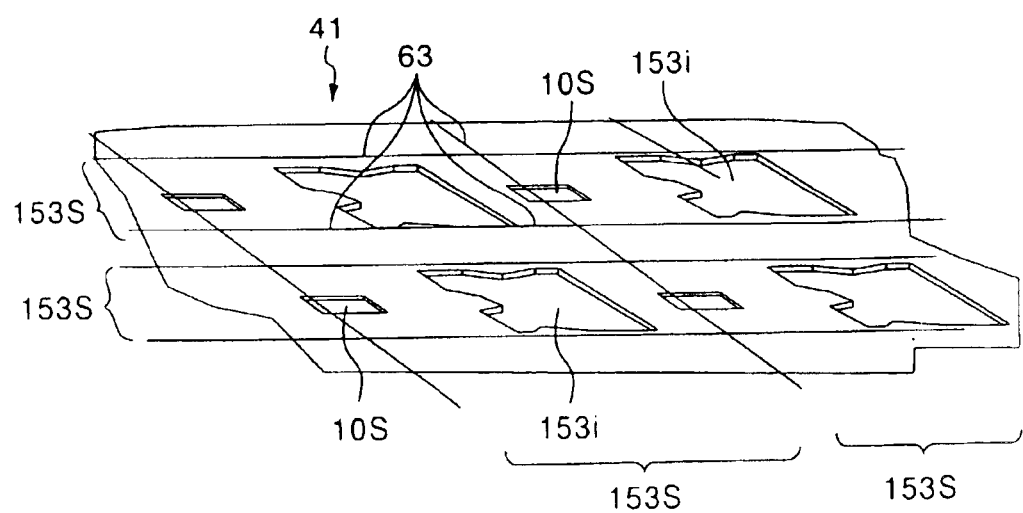
FIG. 11 is a perspective view of an example of the surface of a substrate 41 on which a reversed pattern is formed.
Figure 12:
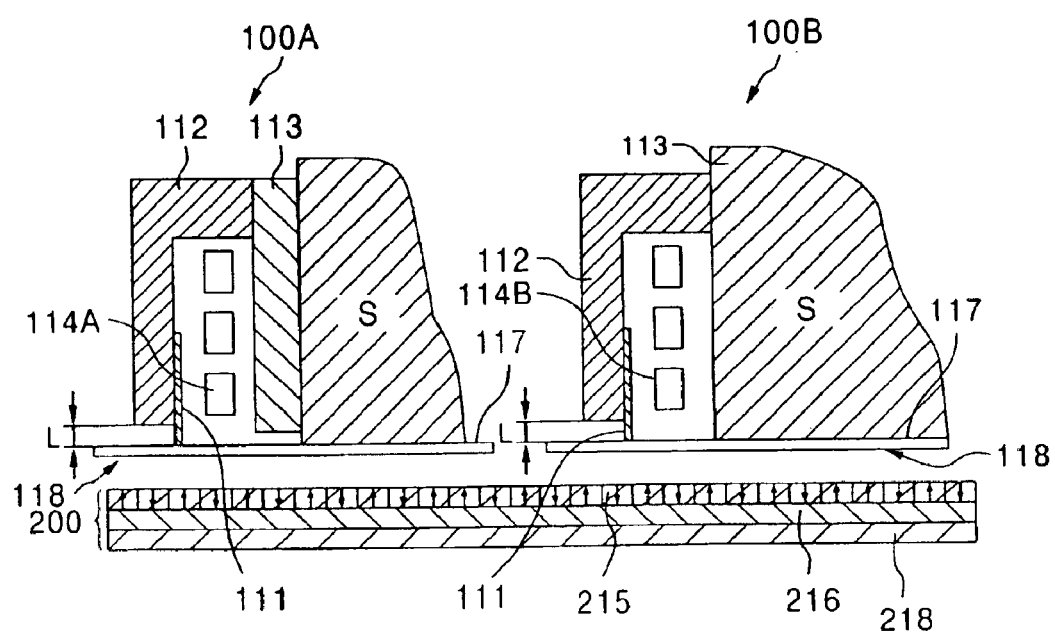
FIG. 12 is a schematic view of a section through the structure of a prior-art magnetic head for perpendicular recording and reproduction.

A perspective view shown in FIG. 11 exemplifies the surface structure of the substrate 41 in which is formed a reversed pattern of this form. In the example shown in this figure, four regions 153S are formed in the surface of the substrate 41 to correspond to four sliders. An indentation 10S that corresponds to the magnetic head formation region and an indentation 153*i* that corresponds to the inverse of the "aero" pattern are provided in each slider formation region 153S.

If the substrate 41 of this form is patterned and then subjected to the series of steps shown in FIGS. 2A through 3D, the indentations on the substrate 41 are transcribed to the medium-facing surface of the slider. If the substrate 41 is sliced along cutting lines 63 after the embedding step shown in FIG. 3C then the substrate 41 is removed as shown in FIG. 3D, it becomes possible to produce the "aero" pattern 153A on the floating surface of the low-floating-height slider 153 by wafer processing alone, without having to use complicated mechanical processes. The result is a huge reduction in costs, of at least one third.

Embodiments of the present invention were described above with reference to specific examples thereof. However, it should be noted that this invention is not limited to these specific examples. For example, similar effects can be obtained by using the entire range of materials and dimensions of the components that configure the magnetic head, as selected by the user.

The magnetic recording/reproduction device mentioned above can also be implemented as a recording-only or reproduction-only device, and the medium is not limited to a hard disk so that the present invention can also be applied to other applications using magnetic storage media, such as flexible disks or magnetic cards. In addition, the magnetic storage medium could be a removable type of device that can be removed from a main apparatus.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No. H11-271365 filed on Sep. 24, 1999 including specification, claims, drawings and summary is incorporated herein by reference in its entirety.

What is claimed is:

1. A method of fabricating a magnetic head for either recording magnetic information onto a magnetic storage medium or reproducing recorded magnetic information therefrom, comprising:

forming a peel-off layer on top of a substrate;

forming a first film on top of the peel-off layer, the first film having a first surface facing on the side of the peel-off layer and a second surface on an opposite side of the first surface;

forming an aperture in the first film, the aperture leading to the first surface from the second surface;

forming a magnetic layer in the aperture, the magnetic layer filling the aperture;

forming a first film magnetic element that is to be magnetically coupled with the magnetic layer on top of the first film; and detaching the resultant assembly from the substrate by etching the peel-off layer and forming a medium-facing surface that is parallel to a main surface of the first film.

2. The method as defined in claim 1, wherein:

the magnetic layer is a main magnetic pole recording magnetic information onto the magnetic storage medium, and the first film magnetic element includes either a return yoke or a recording coil.

3. The method as defined in claim 1, wherein:

the magnetic layer is a first magnetic yoke reproducing magnetic information from the magnetic storage medium, and the first film magnetic element includes either a second magnetic yoke or detecting element.

4. The method as defined in claim 1, further comprising a step of stacking a second film on the medium-facing surface of the first film after the step of detaching the resultant assembly.

* * * * *